US005642107A

United States Patent [19]

Cross

[11] Patent Number: 5,642,107
[45] Date of Patent: Jun. 24, 1997

[54] TELECOMMUNICATIONS SYSTEM FOR DYNAMICALLY MODIFYING AND INDICATING PRESENT NAVIGATIONAL STATUS

[76] Inventor: Marilyn Cross, 3950 N. Lakeshore Dr., No. 702-A, Chicago, Ill. 60613

[21] Appl. No.: 540,925

[22] Filed: Oct. 11, 1995

Related U.S. Application Data

[63] Continuation of Ser. No. 233,770, Apr. 26, 1994, abandoned.
[51] Int. Cl.$^6$ .................................................. G08G 1/123
[52] U.S. Cl. ........................ 340/995; 248/918; 340/990
[58] Field of Search ............................ 340/988, 990, 340/995, 992; 73/178 R; 364/449; 248/674, 309.1, 311.2, 917, 918, 919, 920

[56] References Cited

U.S. PATENT DOCUMENTS

| | | | |
|---|---|---|---|
| 4,747,570 | 5/1988 | Takahashi | 248/309.1 |
| 4,774,672 | 9/1988 | Tsunoda et al. | 340/995 |
| 4,894,655 | 1/1990 | Joguet et al. | 340/988 |
| 4,989,151 | 1/1991 | Nuimura | 340/995 |
| 5,086,958 | 2/1992 | Nagy | 248/311.2 |
| 5,161,028 | 11/1992 | Kawata et al. | 248/917 |
| 5,177,665 | 1/1993 | Frank et al. | 284/918 |
| 5,184,123 | 2/1993 | Bremer et al. | 340/995 |
| 5,272,638 | 12/1993 | Martin et al. | 340/990 |
| 5,293,318 | 3/1994 | Fukushima | 340/990 |

FOREIGN PATENT DOCUMENTS

| | | | |
|---|---|---|---|
| 0588082 | 3/1994 | European Pat. Off. | 340/988 |

*Primary Examiner*—Brent A. Swarthout
*Attorney, Agent, or Firm*—David L. Volk; Brendan B. Dix

[57] ABSTRACT

A computerized telecommunications system is provided whereby a user, such as a traveler, may program a navigational course and then receive dynamically modified audio and visual feedback regarding a present navigational status position while proceeding through the programmed navigational course. The system receives a satellite transmitted signal which represents a predetermined static position along a navigational route. When the traveler coincides with a static position en route, the system utilizes this transmitted signal to dynamically modify and thereby update the previous navigational status position that was stored prior to receiving the current transmitted signal. This dynamically modified navigational status position is then transmitted to the traveler either audibly, or with an electronic visual marker (thereby permitting determination of present navigational status position with merely a quick glance), or both, to keep the traveler updated on his or her present navigational status position without requiring the traveler to concentrate on locating his or her navigational status position as with a conventional map.

7 Claims, 2 Drawing Sheets

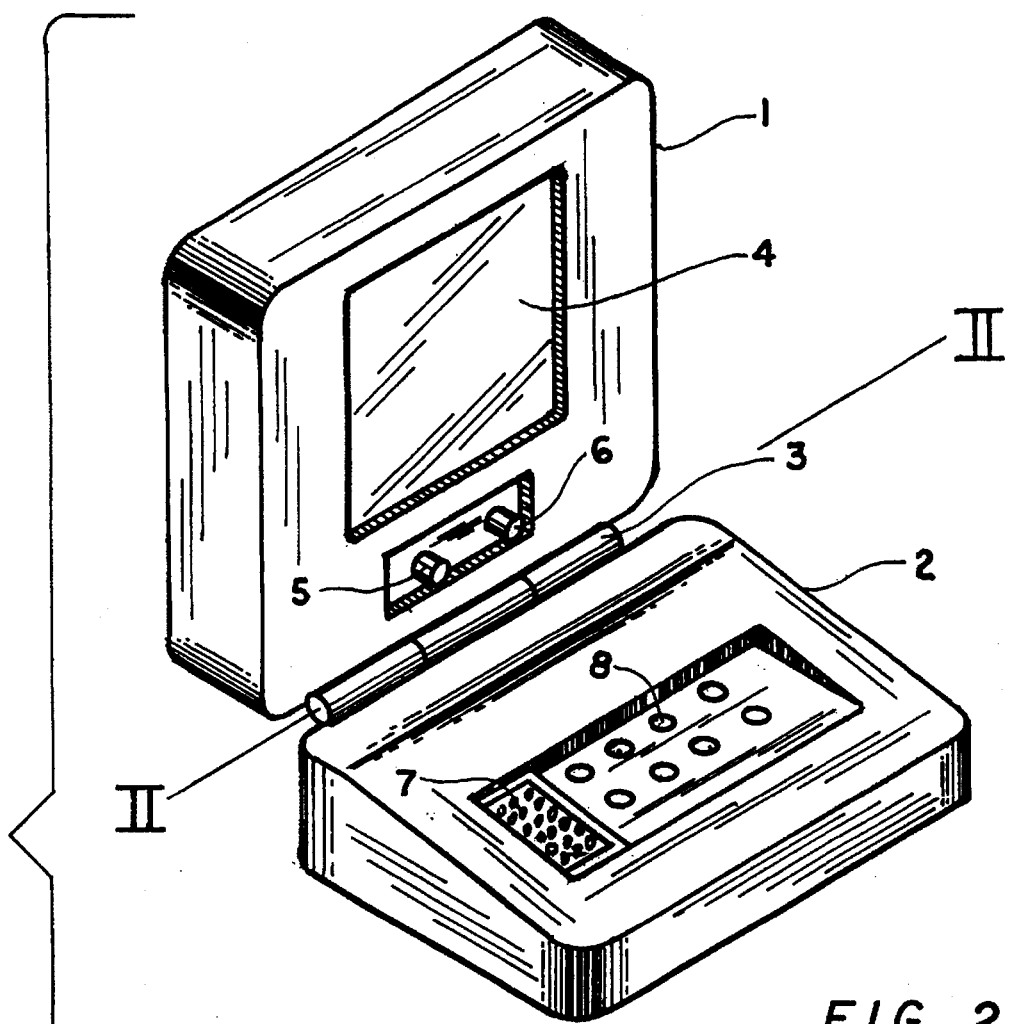
FIG. 2
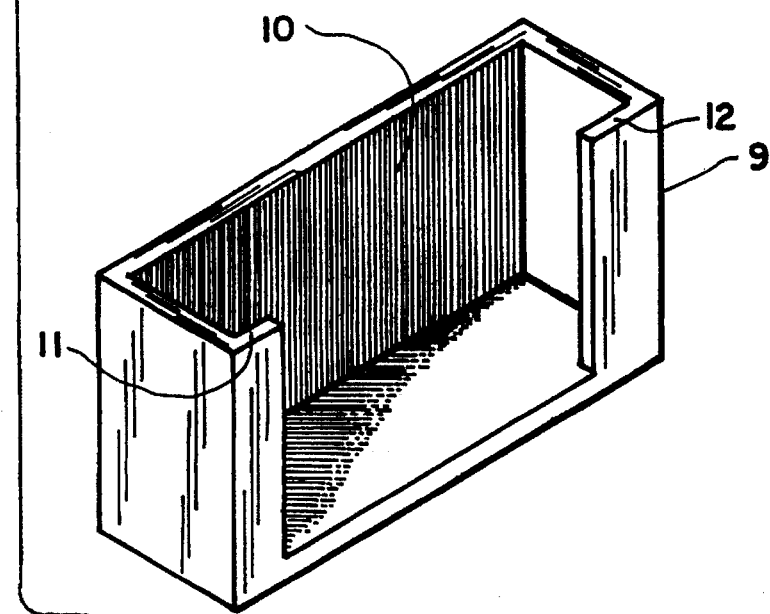

TELECOMMUNICATIONS SYSTEM FOR DYNAMICALLY MODIFYING AND INDICATING PRESENT NAVIGATIONAL STATUS

This is a continuation of application Ser. No. 08/233,770, filed Apr. 26, 1994, now abandoned.

BACKGROUND OF THE INVENTION

1. Field of the Invention

The present invention relates generally to navigational status indicators, such as maps, and more particularly, to a computerized telecommunications system that permits a user, such as a traveler, to program a navigational course and then to receive dynamically modified audio and visual feedback regarding a present navigational status position while proceeding through the programmed navigational course.

2. Description of the Related Art

Conventionally, motorists and other travelers relied on maps or other representations of navigational courses, such as roads or the waterways, to plan a navigational course and to periodically determine their navigational status position en route. Typically, each time the traveler requires an indication of his or her navigational status position, the traveler must: 1) access the correct map; 2) locate on the map the particular route or roadway which represents the route on which the traveler is traveling; and 3) locate the present position on the particular roadway shown on the map, in order to determine the traveler's navigational status position relative to the traveler's point of departure or destination. This conventional process requires concentration and focused attention by the traveler. Consequently, in order to devote the proper concentration and focused attention to this process of reading the map, the traveler usually must take his or her eyes off of the road, as well as take one or both hands off of the steering wheel of his or her vehicle. This necessity puts the traveler in a sometimes unsafe and precarious traveling position. Alternatively, a traveler seeking to avoid an unsafe and precarious traveling position must have somebody present to read the map, which sometimes results in confusion or communication misunderstandings between the parties. As another alternative, the traveler must periodically halt his or her travel to devote full attention to reading the map or asking for directions, thereby losing valuable traveling time.

A need has therefore been felt for a telecommunications system that receives a signal representing a static (fixed) navigational position, wherein this system utilizes the signal when the traveler coincides with the fixed navigational position, in order to modify and thereby dynamically update a previously known navigational status position so that the traveler may be provided with audio and/or visual feedback regarding the traveler's navigational status position, thereby permitting full concentration and focused attention on traveling by eliminating the necessity to view or otherwise stop to concentrate and focus on reading the conventional map for navigational status position.

SUMMARY OF THE INVENTION

It is therefore an object of the present invention to provide a telecommunications system that receives a signal representing a fixed navigational position, wherein this system may utilize the signal when the traveler coincides with the fixed navigational position, in order to modify and thereby dynamically update a previously known navigational status position so that the traveler may be provided with audio and/or visual feedback regarding the traveler's navigational status position.

It is an additional object of the present invention to provide a telecommunications system that may be programmed to reflect a particular course of travel.

It is a feature of the present invention to provide electronic voice synthesization for audio transmission of navigational status position. Another feature of the present invention provides a compass which indicates the direction of travel.

Another feature of the present invention provides voice-editing for navigational course changes via an auto-message system, with a computer sound card, so that the motorist may correct errors in his or her course plan or otherwise incorporate necessary detours.

Briefly summarized according to one aspect of the present invention, a system receives a satellite transmitted signal which represents a predetermined static position along a navigational route. When the traveler coincides with a static position en route, the system utilizes this transmitted signal to dynamically modify and thereby update the previous navigational status position that was stored prior to receiving the current transmitted signal. This dynamically modified navigational status position is then transmitted to the traveler either audibly, or with an electronic visual marker (thereby permitting determination of present navigational status position with merely a quick glance), or both, to keep the traveler updated on his or her present navigational status position without requiring the traveler to concentrate on locating his or her navigational status position as with a conventional map.

According to another aspect of the present invention, a system for providing a dynamically modified present navigational status position relative to a previous navigational status position and a static navigational status position is provided. The system comprises: satellite means for transmitting a navigational input signal representing the static navigational status position; receiving means for receiving said navigational input signal and generating a computer input signal representing the static navigational status position; computer processing means for processing said computer input signal representing the static navigational status position, whereby said computer input signal is combined with the previous present navigational status position to provide thereby a dynamically modified present navigational output signal relative to the previous navigational status position and the static navigational status position; and output means for transmitting said dynamically modified present navigational output signal to provide a dynamically modified present navigational status position.

A preferred embodiment of the output means is a computer graphics display screen for visual transmission of the dynamically modified present navigational status position. Another preferred embodiment of the output means is an audio speaker for audible transmission of the dynamically modified present navigational status position.

An advantage of the present invention is that the traveler may receive dynamically modified navigational status position reports without removing his or her hands from control of his or her vehicle.

Another advantage of the present invention is that the traveler may receive dynamically modified navigational status position reports without removing his or her eyes from the route of travel.

Another advantage of the present invention is that a compact and portable design permits mounting on the dashboard of a vehicle without interfering with the traveler's view or a passenger's comfort.

A further advantage of the present invention is that it may be inexpensively manufactured at costs ranging from $100.00 to $500.00 per unit, depending upon chosen feature preferences.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 2 is a front perspective view of a display and input portion of a preferred embodiment of the present invention shown in combination with a cooperating mounting.

DESCRIPTION OF THE PREFERRED EMBODIMENTS

1. Detailed Description of the Figures

Figure 1:
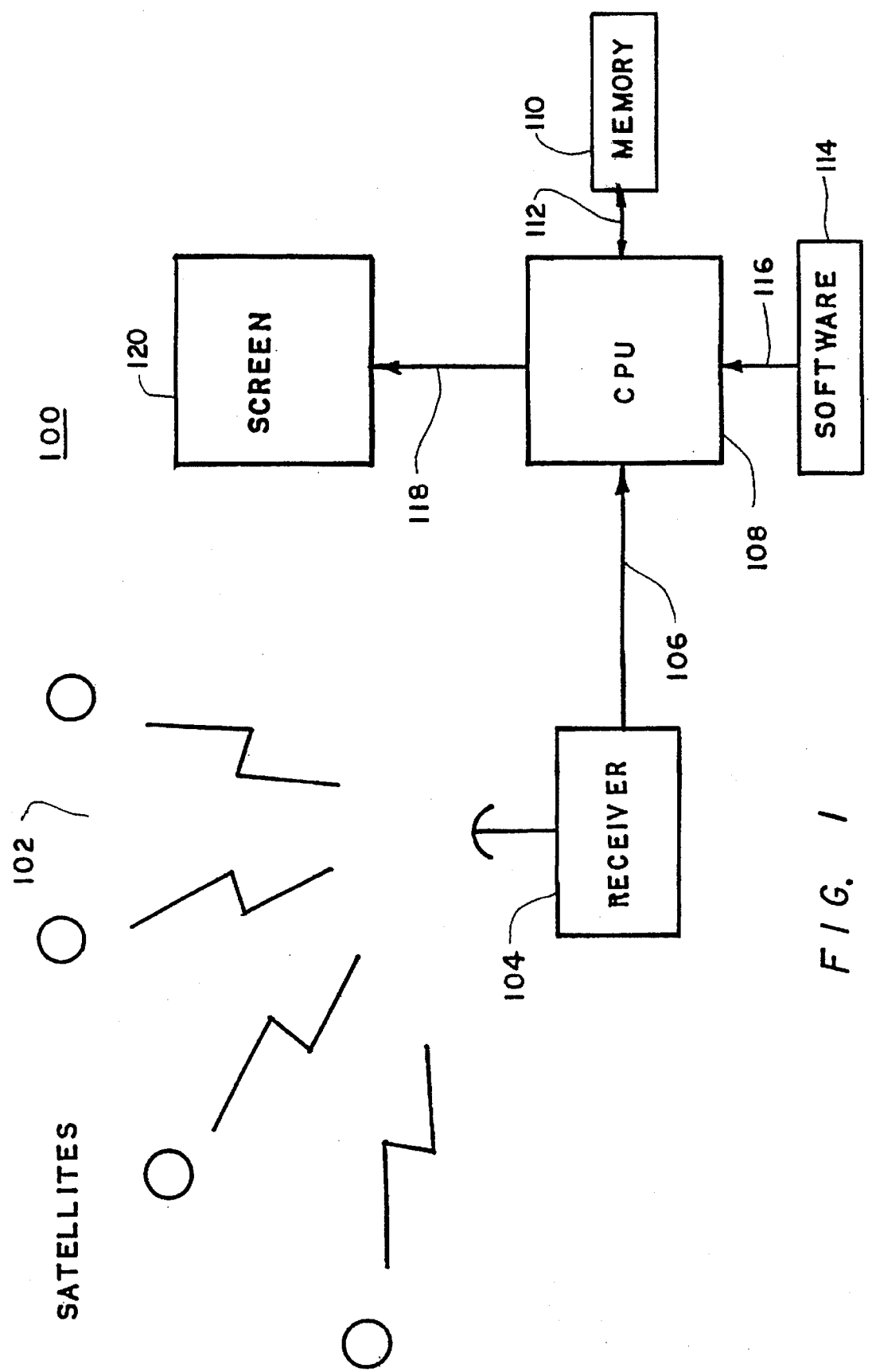
FIG. 1 is a high-level block diagram of a preferred embodiment of the architecture of the present invention.

FIG. 1 shows the basic blocks of the high-level architecture of a preferred embodiment of a system 100 for providing a dynamically modified present navigational status position according to the present invention. At least one satellite 102 transmits a navigational input signal which represents a predetermined static navigational status position (not shown). The transmitted navigational input signal is received by a receiver 104 which generates a computer input signal that also represents the predetermined static navigational status position. A path 106 connects the receiver 104 to a Computer Processing Unit (CPU) 108. The computer input signal is transmitted through path 106 from the receiver 104 to the CPU 108 for processing with a previous present navigational status position as stored in a memory 110 through a bi-directional input/output path 112. Software 114 provides processing directions for the CPU 108 through a path 116. Another preferred embodiment of the present invention provides hard-wired instructions without the software 114. Finally, a dynamically modified present navigational output signal is stored in the memory 110 as well as transmitted through a path 118 to a screen 120 for visual output to the traveler. Another preferred embodiment of the present invention transmits the dynamically modified present navigational output signal through the path 118 to an audio speaker (not shown) for audible output to the traveler.

In FIG. 2, a front perspective view of a preferred embodiment of a display housing 1 and a computer housing 2 of the present invention is shown in combination with a preferred embodiment of a cooperating mounting bracket 9. A hinge 3 connects the display housing 1 to the computer housing 2 in a manner to permit the display housing 1 to be radially positioned toward and away from the input housing 2 along the axis II—II. A computer graphics display screen 4, a "Start" function key 5, and a "Stop" function key 6 is each encased by the display housing 1. The screen 4 provides a graphical display of the dynamically modified present navigational output signal received from the CPU 108 through the path 118.

In addition, the receiver 104, the CPU 108, the memory 110, an audio speaker 7 and a function input keyboard 8 is each encased by the computer housing 2. A preferred embodiment of the computer housing 2 has measurements approximating 1 inch in height, 6 inches in width, and a range of 3 to 6 inches deep. Electrical connections (not shown) are provided between the screen 4, the keys 5, 6, an audio speaker 7, and a function input keyboard 8 through wires embedded in the hinge 3. In a preferred embodiment of the present invention, the audio speaker 7 operates in conjunction with the screen 4 and provides an audible transmission of the dynamically modified present navigational output signal received from the CPU 108 through the path 118.

Finally, the cooperating mounting bracket 9 receives the display housing 1 between a back surface 10 and flanges 11, 12. The hinge 3 slides between the flanges 11, 12 and the computer housing 2 extends away from the bracket 9, approximately perpendicular to the display screen 4 and the display housing 1.

2. Operation of the Preferred Embodiment

In accordance with a preferred embodiment of the present invention, the display housing 1 is mounted within the bracket 9 and appropriate power cables (not shown) are connected. The present invention is powered "on" with the key 5 and powered "off" with the key 6.

When the system is powered "on", the receiver 104 receives signals as transmitted from the satellite 102 and the CPU 108 processes the signals from the receiver 104. The software 114 provides instructions by which the CPU 108 dynamically modifies the navigational status positions stored in the memory 110. Modified navigational status positions are transmitted to the audio speaker 7 for audible transmission to the traveler as well as to the screen 4 for visual transmission to the traveler. The function input keyboard 8 provides the traveler with the ability to electronically plot and program course routes so that the system 100 may "come alive" as an actual "navigator" which announces and displays such information as: navigation status, mileage and gas levels, and warning messages at designated time intervals, and "on/off course" confirmations.

When the system 100 is powered "off" with the key 6, the electrical cables (not shown) may be disconnected and the display housing 1 may be removed from the bracket 9. The display housing 1 may then be folded toward the computer housing 2 along the axis II—II of hinge 3 to form a protective covering of the screen 4, the speaker 7, and the function input keyboard 8, for convenient and portable mobility and storage.

The foregoing description of the preferred embodiment of the present invention has been presented for purposes of illustration and description. It is not intended to be exhaustive or to limit the present invention to the precise form disclosed, and obviously many modifications and variations are possible in light of the above teachings.

The preferred embodiment was chosen and described in order to best explain the principles of the present invention and its practical application to those persons skilled in the art and thereby to enable those persons skilled in the art to utilize best the present invention in various embodiments and with various modifications as are suited to the particular use contemplated. It is intended that the scope of the present invention be broadly defined by the claims.

What is claimed is:

1. A system for providing a motorist with a navigational status position, wherein said system comprises:
   a. a display housing;
   b. a computer housing, said computer housing hingedly connected to said display housing;
   c. a substantially rectangular box shaped mounting bracket including an open top and a partially open front wall;

d. said mounting bracket configured to receive said display housing through said open top within said mounting bracket such that said computer housing extends away from said mounting bracket and such that said front wall restrains said display housing within said mounting bracket, the connection between said computer housing and said display housing extending through said partially open front wall.

2. The system according to claim 1, wherein said mounting bracket is for mounting on a dashboard of a vehicle.

3. The system according to claim 2, wherein said computer housing is substantially perpendicular to said display housing when said display housing is within said mounting bracket.

4. A system for providing a motorist with a navigational status position, wherein said system comprises:
   a. satellite means for transmitting a navigational input signal;
   b. receiving means for receiving said navigational input signal and generating a computer input signal;
   c. computer processing means connected to said receiving means, for processing said computer input signal to provide a navigational output signal;
   d. memory means connected to said computer processing means, for storing electronically the computer input signal for processing by said computer processing means; and
   e. a computer graphics display screen connected to said computer processing means, for visually transmitting said navigational output signal to provide a navigational status position.
   f. a display housing;
   g. said computer graphics display screen contained within said display housing;
   h. a computer housing;
   i. said receiving means contained within said computer housing;
   j. said computer processing means contained within said computer housing;
   k. said memory means contained within said computer housing;
   l. said computer housing including a keyboard;
   m. said computer housing hingeally connected to said display housing;
   n. a substantially rectangular box shaped mounting bracket including an open top and a partially open front wall;
   o. said mounting bracket configured to receive said display housing through said open top within said mounting bracket such that said computer housing extends away from said mounting bracket and such that said front wall restrains said display housing within said mounting bracket, the connection between said computer housing and said display housing extending through said partially open front wall.

5. The system according to claim 4, wherein said mounting bracket is for mounting on a dashboard of a vehicle.

6. The system according to claim 5, wherein said computer housing is substantially perpendicular to said display housing when said display housing is within said mounting bracket.

7. The system according to claim 4, further comprising:
   a. a compass which indicates a direction of travel.

* * * * *